(No Model.)
H. PENNINGTON.
METHOD OF SOLDERING TIN CANS.
No. 510,931. Patented Dec. 19, 1893.
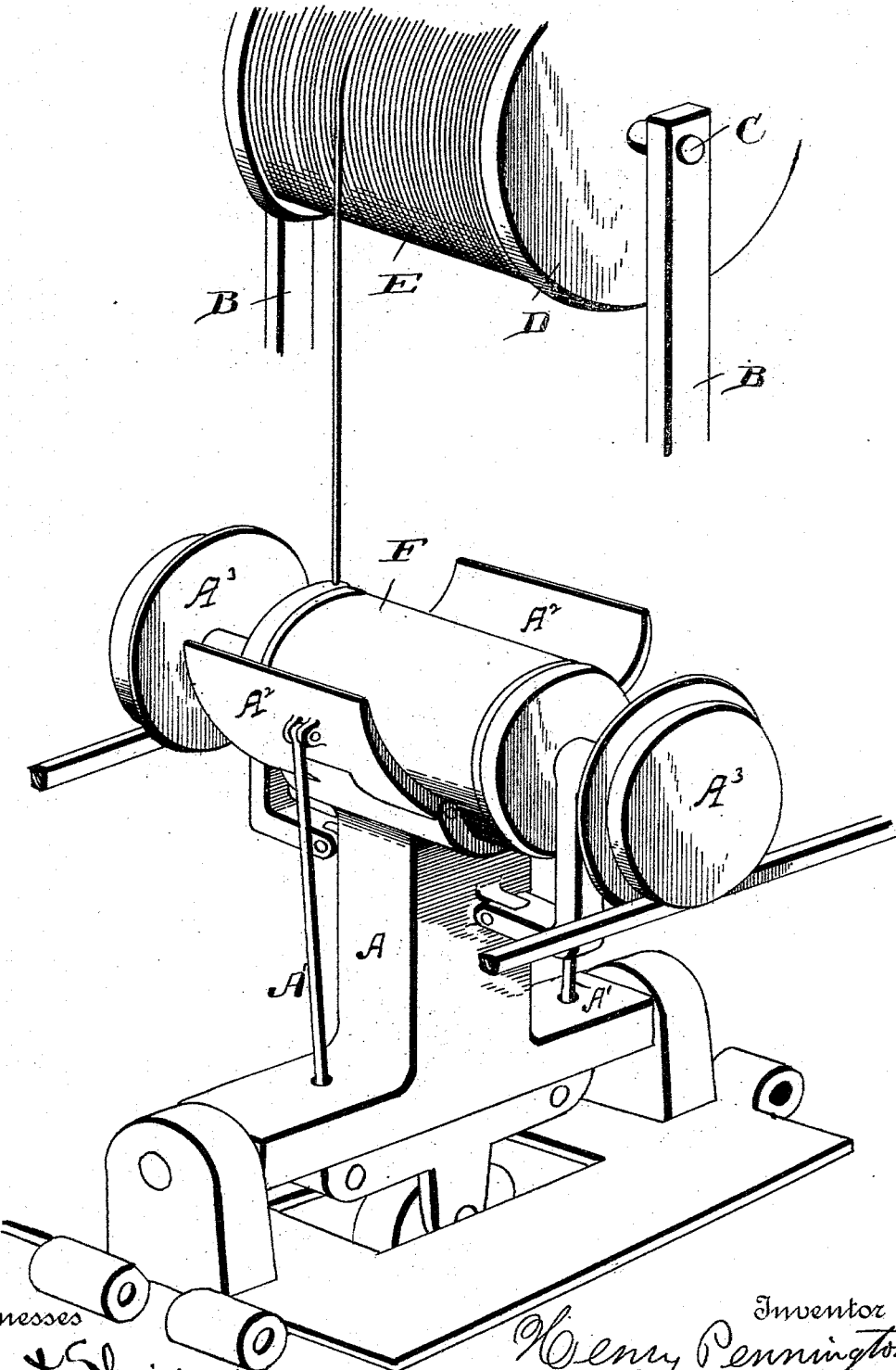

UNITED STATES PATENT OFFICE.

HENRY PENNINGTON, OF PHILADELPHIA, PENNSYLVANIA.

METHOD OF SOLDERING TIN CANS.

SPECIFICATION forming part of Letters Patent No. 510,931, dated December 19, 1893.

Application filed August 4, 1893. Serial No. 482,385. (No specimens.)

*To all whom it may concern:*

Be it known that I, HENRY PENNINGTON, a citizen of the United States, residing at Philadelphia, in the county of Philadelphia and State of Pennsylvania, have invented certain new and useful Improvements in Methods of Soldering Tin Cans; and I do declare the following to be a full, clear, and exact description of the invention, such as will enable others skilled in the art to which it appertains to make and use the same, reference being had to the accompanying drawing, and to the letters of reference marked thereon, which forms a part of this specification.

This invention relates to certain new and useful improvements in the method of soldering the tops and bottoms of cans, and it has for its objects among others to simplify the process or method thereby effecting a material saving in time and consequent cost of production. I apply the solder in wire or stick form to the can during its revolution, and depend upon the rotary movement of the can to equally distribute the solder along the joint. The can is heated in any well known way and is presented to the point where the solder is suspended sufficiently heated to melt the solder. No attention is necessary on the part of the operator except to apply the solder as the can reaches the predetermined point. This, however, may be done automatically, dispensing with the services of the operator at this point; the means whereby this step is rendered automatic will form no part of this invention.

The advantages of my method, will be readily appreciated by those skilled in the art.

Other objects and advantages of the invention will hereinafter appear and the novel features thereof will be specifically defined by the appended claim.

In carrying out my method the can may be formed in any suitable way, as for instance in the Patent No. 371,493, dated October 11, 1887, and presented to the solder by suitable devices which rotate the can while the solder is applied to the end seams for soldering the tops and bottoms in place. The can is heated in any suitable manner before it is presented to the solder.

In the accompanying drawing, which, with the letters of reference marked thereon, forms a part of this specification, I have shown such portions of a convenient apparatus for carrying out my process, as will be necessary to a proper understanding of the same.

In the said drawing, I have shown a diagrammatic view of the apparatus showing the solder just about to be applied.

As the present invention does not pertain to the mechanism for forming the cans, nor for applying the tops and bottoms, nor to the devices for rotating the can nor for heating the same just before it is presented to the solder, such devices have not been illustrated; they may be of any suitable construction; a suitable construction will be found in the patent above referred to. It is only necessary that the cans should be revolved at a rapid rate as they are presented to the solder.

The mechanism shown for supporting and feeding the can is the same as that shown and described in the patent hereinbefore referred to.

Reference now being had to the details of the drawing by letter, A designates one of the standards of the machine and B uprights in which is supported so as to revolve a shaft C carrying a drum D upon which is carried the solder E which is in wire or stick form and of such nature as to be quickly converted into a semi liquid form upon application of heat. The end of the solder hangs loosely within convenient reach of the attendant and the drum should be mounted to revolve with great freedom.

A' are the rods which are pivotally connected with the hinged clamping arms $A^2$ which embrace the can and which actuate the same in the manner set forth in the patent before mentioned and to which reference is made for a fuller description of these parts. The can is rotated on its own center by the rotation of the wheels $A^3$ of the can holding mechanism and the can is held in contact with the solder while its rapid revolution is continued and the solder is melted and caused to flow throughout the seam as the can moves from the soldering devices.

F represents a can body with top and bottom, the end seams of which it is desired to solder. This can has been formed and is presented to the revolving devices, adapted to revolve the can at a rapid rate while it is being carried forward by the conveyer. The can is moved automatically forward in its direct line of feed and simultaneously rotated on its own center as will be readily understood from the drawing.

Just before the can is presented to the point beneath the drum it is heated by suitable means, not shown, so that when the attendant holds the end of the solder upon the can it is immediately melted, and, by the rapid revolution of the can, the melted solder is evenly distributed along the seam. This method also avoids the danger of burning the can by the accidental engagement of the soldering iron therewith.

What I claim as new is—

The herein described method of soldering tin cans, the same consisting in heating the can, moving the can continuously forward in its direct line of feed and simultaneously rapidly rotating it on its own center, contacting the same with a solid bar or wire solder and continuing said rapid rotation to flow the solder throughout the seam as the can is moving from the soldering devices, substantially as shown and described and for the purpose specified.

In testimony whereof I affix my signature in presence of two witnesses.

HENRY PENNINGTON.

Witnesses:
HENRY M. PATSHELL,
HARRY R. MAAS.